United States Patent [19]

Mikofalvy et al.

[11] Patent Number: 5,199,652

[45] Date of Patent: Apr. 6, 1993

[54] METHOD FOR SEPARATING A MIXTURE OF TWO PLASTICS WITH SIMILAR SPECIFIC GRAVITIES

[75] Inventors: Bela K. Mikofalvy, Avon Lake; H. Khim Boo, Strongsville, both of Ohio

[73] Assignee: The B. F. Goodrich Company, Akron, Ohio

[21] Appl. No.: 843,710

[22] Filed: Feb. 28, 1992

[51] Int. Cl.$^5$ .................... B02C 23/08; B03B 1/00
[52] U.S. Cl. .......................... 241/2; 209/2; 209/4; 241/24; 241/DIG. 38
[58] Field of Search .............. 209/2, 3, 4; 241/20, 241/DIG. 38, 24

[56] References Cited

U.S. PATENT DOCUMENTS

| | | | |
|---|---|---|---|
| 3,516,841 | 6/1970 | Haveman | 106/193 |
| 3,670,969 | 6/1972 | Terada | 241/27 |
| 3,814,240 | 6/1974 | Laundrie | 209/11 |
| 3,836,486 | 9/1974 | Hafner | 260/2.3 |
| 3,925,200 | 12/1975 | Izumi et al. | 209/9 |
| 3,926,790 | 12/1975 | Izumi | 209/9 |
| 3,926,791 | 12/1975 | Izumi et al. | 109/9 |
| 3,976,563 | 8/1976 | Scalco | 209/3 |
| 4,000,031 | 12/1976 | Acobas | 262/4 |
| 4,067,826 | 1/1978 | Emery | 260/2.3 |
| 4,105,593 | 8/1978 | Stavrinou | 260/2.3 |
| 4,119,533 | 10/1978 | Saitoh et al. | 209/155 |
| 4,132,633 | 1/1979 | Saitoh et al. | 209/9 |
| 4,352,732 | 10/1982 | Massicotte | 209/17 |
| 4,379,525 | 4/1983 | Nowicki et al. | 241/20 |
| 4,385,951 | 5/1983 | Pressau | 156/105 |
| 4,578,184 | 3/1986 | Rasmussen | 209/3 |
| 4,617,111 | 10/1986 | Grimm et al. | 209/4 |
| 4,746,422 | 5/1988 | Grimm | 209/172 |
| 4,775,464 | 10/1988 | Ferrara et al. | 209/172 |
| 4,797,192 | 1/1989 | Takiguchi | 204/412 |
| 4,826,897 | 5/1989 | Mehra et al. | 523/455 |
| 5,061,735 | 10/1991 | Zielinski | 521/465 |

OTHER PUBLICATIONS

Modern Plastics, Jun. 1990, pp. 15-16; "PVC Melt Point Keys Scrap Separation".

*Primary Examiner*—Frank T. Yost
*Assistant Examiner*—Kenneth E. Peterson
*Attorney, Agent, or Firm*—Helen A. Odar

[57] ABSTRACT

A novel process has been found in which the two types of plastic particles having similar specific gravities in a mixture are safely, efficiently, effectively and economically separated after being soaked in a plasticizer for a predetermined amount of time. The recovered and reclaimed particles can be reprocessed without any additional steps other than washing and drying. This novel process is useful in recycling waste plastic materials especially those materials containing polyvinyl chloride.

20 Claims, No Drawings

METHOD FOR SEPARATING A MIXTURE OF TWO PLASTICS WITH SIMILAR SPECIFIC GRAVITIES

BACKGROUND OF THE INVENTION

1. Field of the Invention

This invention relates to a method for separating and recovering desired plastic particles from a mixture containing two or more plastic particles. More particularly, this invention relates to a process for the separation of material made of plastics having similar specific gravities. In particular, the process relates to separating a mixture of polyvinyl chloride and another plastic having a similar specific gravity to that of polyvinyl chloride into its component particles.

2. Description of the Art

Recycling and reclaiming waste materials has become important in abating pollution, preserving the environment, and conserving energy due to the reprocessing of the reclaimed waste materials. Because of the wide variety of articles manufactured today using various plastics, discarded plastics have become a large source of waste materials.

Effectively separating and recovering various plastics is important in recycling waste plastic materials. Waste plastic materials are diverse and may be composed of numerous different types of materials such as polyvinyl chloride, polyethylene, polypropylene, and polyethylene terephthalate, for example. These materials are found in municipal plastic scrap which includes bottles and other packaging materials, electrical wire and cable scrap, and industrial plastic scrap.

Numerous methods have been developed for separating plastic materials. Generally, a plastic material can be separated into its components by various floatation processes. U.S. Pat. No. 3,925,200 generally discloses such a process. U.S. Pat. No. 4,578,184 discloses the use of density adjustors for the separation medium used in flotation methods. This patent discloses the use of plasticizers to adjust the density of the solution used to separate polyethylene and polyvinyl chloride. These well known flotation methods are quite effective for mixtures of plastic materials having different specific gravities, such as polyethylene terephthalate and polyethylene or polyvinyl chloride and polyethylene. However, these known methods are ineffective for mixtures of plastics having similar specific gravities such as for example, polyvinyl chloride (hereinafter "PVC") and polyethylene terephthalate (hereinafter "PET").

The effective, safe, efficient, easy and economical separation of mixtures of plastics with similar specific gravities is important because of the abundance of articles manufactured from multicomponent plastics such as plastic bottles, electrical cable and wire insulation and packaging materials. Often, when various different types of plastics are commingled, there may be problems with reprocessing the materials and with the properties of the resultant products. For example, when PVC particles are commingled with PET particles, the plastic does not reprocess as well as either PVC or PET by itself. PET contaminated by PVC cannot be reprocessed because PVC degrades at lower temperatures than the PET processing temperature. Thus, no useful product can be obtained. On the other hand, PVC contaminated by PET is not useful because PET does not melt at the PVC processing temperatures. Rather, the PET contaminant particles are present as defects that significantly lower the physical properties of PVC. Therefore, a need exists to effectively separate mixtures of plastics containing plastic particles of similar specific gravities. In particular, a need exists to effectively separate a mixture containing PVC and another plastic having a similar specific gravity to that of PVC.

In order to separate mixtures of plastics, several techniques have been developed. A thermal process for separating PVC and PET is described in "PVC Melt Point Keys Scrap Separation," Modern Plastics, June 1990, pp. 15–16. A mixture of PVC and PET is metered onto a conveyor belt which transports the mixture through a heating chamber. The heating chamber is maintained at the melt point for PVC. As the PVC melts, it adheres to the conveyor belt. At the end of the conveyor belt, the PVC is scraped off the belt and the PET drops off the conveyor belt. The two components are thereby separated.

Zielinski in U.S. Pat. No. 5,061,735, describes another thermal process for the separation of mixtures of plastics. Zielinski heats the mixture to a temperature sufficient to cause one of the plastic materials to adhere to itself while simultaneously agitating the mixture so that adhering particles agglomerate to form larger particles. The contaminant material particles, which could be formed of another plastic, do not adhere to each other or to the agglomerated thermoplastic particles. The mixture is cooled and agitated. The larger agglomerated particles are then separated from the smaller contaminant particles using a series of screens.

Both of these methods necessitate heating the particles close to the melting point of one of the plastics. This heating may degrade the properties of at least one of the components of the plastic mixture such as PVC, rendering the recycled component unusable.

Electromagnetic identification is another means to separate mixtures of plastic. For example, chlorine scanning is used to separate PET from PVC when the two are mixed together. In this technique, PVC is segregated from the PET by electromagnetic identification of the chlorine atoms. ("PVC Melt Point Keys Scrap Separation", Modern Plastics, June 1990, pp.15–16) This technique is expensive due to the equipment needed to carry out the segregation. In addition, mechanical problems associated with the process render contaminated plastic particles which are not readily reprocessed and possess inferior physical properties and appearance. This is especially true in applications where very thin wall parts are required.

Another technique useful in separating mixtures of plastic particles is a solvent processing technique. This technique is dangerous because the solvents used in the technique can ignite due to their low flash points. In addition, the solvents release harmful vapors. An example of a solvent processing technique is disclosed in U.S. Pat. No. 4,617,111 to Grimm et. al. for the separation of PVC from PET particles. Grimm et. al. add a solution composed of a solvent of polyvinyl chloride having a density of less than 0.95 grams per cubic centimeter and water to flakes of PET and PVC. The flakes are conditioned in the solution for a predetermined time so that the PVC flakes absorb the solvent whereas the PET flakes do not because they are insoluble in the solvent. The PVC flakes are then separated from the PET flakes and recovered. The solvent must then be extracted by an expensive process from the PVC flakes before the PVC can be reprocessed.

Although these known methods are useful, there still exists a need for easy, safe, efficient and inexpensive separation of mixtures of plastic particles where the particles have similar specific gravities.

Accordingly, a primary objective of the invention is to effectively and efficiently separate and reclaim the plastic particles having similar specific gravities from mixtures containing the plastic particles which cannot be separated by conventional flotation or centrifugation techniques.

An additional object of the invention is to economically reclaim each of the component plastic particles from mixtures containing the plastic particles having similar specific gravities without additional recovery steps other than normal rinsing and drying.

Another object of the invention is to easily and economically separate and reclaim plastic particles having similar specific gravities from mixtures of the particles.

Yet a further object of the invention is to recover plastic particles having similar specific gravities from mixtures containing the particles so that they can be effectively reprocessed or reused.

Still another object of the invention is to safely and efficiently recover plastic particles having similar specific gravities from mixtures containing the particles.

Yet an additional object of the invention is to recover PVC from a mixture containing PVC and another plastic having a similar specific gravity to that of PVC.

SUMMARY OF THE INVENTION

The foregoing and other objects, advantages and features of the invention may be achieved by a method of separating, and reclaiming plastic particles having similar specific gravities from mixtures containing the plastic particles. More particularly, it has been found that dividing plastic materials, including waste plastic materials, into smaller particles or granules, the different plastic particles can then be separated from each other by soaking the divided mixture for a predetermined amount of time in a plasticizer. During the plasticizer bath, one type of plastic particle does not absorb the plasticizer, whereas the other type of plastic particle does. Therefore, the density of the plastic absorbing the plasticizer decreases. It has been further discovered that by removing any excess plasticizer which is either free or on the surface of the nonabsorbing plastic particles prevents a change in the surface properties of the nonabsorbing plastic. One type of plastic can then be segregated and separated from the other type of plastic using any separation process such as the conventional flotation or centrifugation processes. Additional recovery steps other than washing and drying are not necessary to obtain the reclaimed, separated component particles. Moreover, these reclaimed plastic particles can be easily reprocessed by any processing method. This invention has been found to be particularly useful for separating PVC from another plastic having a similar specific gravity to that of PVC.

DETAILED DESCRIPTION OF THE INVENTION

Plastic mixtures containing plastic particles having similar specific gravities are not readily and effectively separated by known separation techniques. The present invention relates to a novel method of separating plastic mixtures formed of plastics having similar specific gravities. Plastics having similar specific gravities would have densities within approximately 0.1 grams per cubic centimeter of each other.

It is important to separate mixtures of plastic particles having similar specific gravities into the underlying components because often the components degrade each others properties, discolor the reprocessed plastics and corrode the equipment when present as contaminants during reprocessing. Several methods have been developed for the separation of mixtures of plastics. However, these known methods are not effective, efficient, safe or economical. Many times these known methods require numerous, repetitive and often laborious steps to reclaim at least one type of plastic particle from a mixture.

This invention relates to a method of separating and reclaiming plastic particles having similar specific gravities from plastic materials made of a mixture of plastics. The densities of the two plastics in the material should be within about 0.1 grams per cubic centimeter of each other. The preferred plastic material is a recoverable plastic material or plastic mixture. Most preferably the recoverable material can be a waste material. Preferably, the plastic material contains a mixture of PVC and another plastic having a similar specific gravity to that of PVC. The plastic material can contain from less than one percent PVC to more than ninety nine percent PVC. The most preferred plastic material contains a mixture of PVC and PET particles. The density of PVC is in the range of about 1.29-1.36 grams per cubic centimeter, whereas the density of PET is in the range of about 1.30-1.37 grams per cubic centimeter.

In addition, the plastic material may contain thermal stabilizers, dyes, flame retardant, smoke suppressants, fillers, plasticizers, impact modifiers, antioxidants, lubricants, processing aids and other conventional additives. These additives do not affect the novel process of this invention.

According to the invention, a plastic material containing the different types of plastic particles with similar specific gravities is divided into smaller particles or granules using any method to divide the waste material into small particles. For example, the material can be ground, shredded, chopped, flaked, sheared, crushed, comminuted, torn or otherwise reduced in size to smaller particles. The preferred method of dividing the plastic material is grinding. Preferably, the particles range in size from one eighth of an inch to one half of an inch. The particle size does not affect the separation technique of the invention. Although not part of the scope of this invention, the particle size may be important depending upon what reprocessing technique is chosen. One of ordinary skill could readily ascertain the size to easily reprocess the reclaimed particles.

The divided particles are then added to a plasticizer for one of the plastics in a plasticizer bath. The maximum amount of particles in the plasticizer bath can comprise from about twenty to about forty percent solids. The plasticizer used in the bath is safe, and not explosive at the operating conditions. Moreover, the plasticizer is used by itself and is not in a solution. The plasticizer bath can be formed using any type of plasticizer including phthalate plasticizers, phosphate plasticizers, trimellitate plasticizers, low temperature plasticizers or blends thereof. Low temperature plasticizers include sebacate or adipate plasticizers. The type of plasticizer or blend used depends upon the type of plastics to be separated. Phthalate and adipate plasticizers such as dioctyl phthalate/adipate, diisooctyl phthalate/adipate and dialkyl ($C_7$–$C_9$)-phthalate/adipate are the preferred plasticizers. The especially preferred plasticizer is dioctyl adipate when the material to be separated includes PVC particles.

Generally, the divided particles are maintained in the plasticizer bath for approximately five to thirty minutes. The amount of time in the plasticizer bath is dependent upon the temperature of the bath and the degree of flexibility desired in the reprocessing of the plastic particles which absorb the plasticizer. The most preferred time is 15 minutes. During this time period, the temperature of the plasticizer solution is maintained in the range of approximately 90 to 130 degrees Centigrade. 120 degrees Centigrade is the preferred temperature. The higher the temperature of the bath, the less time the particles need to be in the bath, due to the increased diffusion rate of the plasticizer into the absorbing particles. However, the temperature of the plasticizer bath must be maintained above the glass transition temperature of one of the types of plastic particles and preferably but not necessarily, below the glass transition temperature of the other plastic particles, so that the plastic particles having the lower glass transition temperature soften and allow the plasticizer to diffuse into these plastic particles.

After being removed from the bath, free or excess plasticizer is removed from the nonabsorbing plastic particles by any method appropriate for the removal of excess plasticizer so that it does not adhere to the surface of the nonabsorbing particles thereby changing the apparent surface density of these particles. For example, the plasticizer can either be washed off the plastic particles or it can be dried off. In the preferred embodiment, the plastic particles are washed and dried to remove any excess plasticizer.

Afterwards, one type of plastic particle is separated from the other plastic particles by any separation method such as centrifugation, differences in dielectric constants, or flotation, for example. Preferably, when the mixture contain PVC and PET particles, they are separated from each other by a flotation method through a controlled density medium.

In the flotation method, the divided and washed particles are transferred into a tank or classifier having a solution with a density less than the density of PET. The preferred density of the solution is between 1.1 to 1.3 grams per cubic centimeter. The divided and washed particles are in the tank for a few minutes. The PVC particles which have absorbed the plasticizer have a lower specific gravity than PET particles, and they float to the top of the tank while the PET particles sink to the bottom of the tank. Alternatively, the flotation process can be done in a hydrocyclone.

The separated plastic particles can then be independently recovered without any additional separation or recovery steps other than conventional washing and drying. The recovered plastic particles are then easily reused. Moreover, the plastic particles which absorbed the plasticizer are very easily reprocessed because they already contain a plasticizer. The recovered plastic particles can then be reprocessed by any methods used to process plastics, including blending, injection molding and extruding. These reprocessed plastics have acceptable mechanical properties and can be used in commercial applications. For example, if PVC is recovered, the flexible PVC can be used for hoses, floor mats, and wire cable insulation and other flexible applications of PVC.

EXAMPLES

EXAMPLE 1

A post-consumer waste bottle material formed of a mixture of ninety five percent PVC and five percent PET which was ground into flakes could not be separated using a flotation method in a density medium of 1.312 grams per cubic centimeter because the specific gravities of PVC and PET overlap in this range. In this example, a calcium nitrate hydrate and water were used to form the solution. All the particles sank to the bottom immediately. Afterwards, the particles were soaked in a plasticizer bath for five minutes. The amount of particles in the bath comprises 6 to 7% solids. The plasticizer used was dioctyl phthalate. The temperature of the plasticizer was maintained at approximately 90 degrees Centigrade. After the excess plasticizer was removed, the flakes were transferred to a flotation tank having the same density medium used above (1.312 grams per cubic centimeter). The PET sank to the bottom of the tank while the PVC floated to the top. The PVC particles were thereby separated from the PET particles.

EXAMPLE 2

The same PVC and PET flakes were used as in Example 1. These flakes were soaked in a plasticizer bath of dioctyl adipate at 120 degrees Centigrade for 5 minutes. The amount of particles in the bath comprises 6 to 7% solids. After the excess plasticizer was removed, the flakes were transferred to a flotation tank having a density of 1.248 grams per cubic centimeter. Once again, the PVC floated, whereas the PET sank. The PVC was then separated from the PET.

EXAMPLE 3

The same PVC and PET flakes were used as in Example 1. The flakes were soaked in dioctyl adipate for various times. Listed below is the time the particles were soaked along with the density of the flotation medium necessary to separate the particles after being soaked in the plasticizer for that time period. As can be seen, the longer the particles are soaked, the lower the density of the flotation medium needed to separate the particles. However, as can be seen, as long as the particles were soaked in the plasticizer for a few minutes, the density of the flotation medium was always less than the density of PET.

| Time (min.) | Density (g/cc) |
| --- | --- |
| 0 | Cannot be separated at 1.312 |
| 5 | 1.248 |
| 15 | 1.154 |
| 30 | 1.150 |
| 60 | 1.142 |
| 90 | 1.064 |

From the foregoing description, one skilled in the art can easily ascertain the essential characteristics of the invention and without departing from the spirit and scope thereof make various changes and modifications of the invention and adapt it to various usages and conditions. Accordingly, the whole of the foregoing description is to be construed in an illustrative and not in a limitative sense, for the scope of the invention is defined solely by the appended claims.

We claim:

1. A method for the separation of a plastic material containing a mixture of at least two plastics having similar densities, wherein the density of each of the plastics is within 0.1 grams per cubic centimeter of the density of the other plastics comprising: dividing the plastic material into smaller, divided particles, soaking the divided particles in a plasticizer for one of the plastics for a predetermined amount of time, removing any excess plasticizer, and separating one type of plastic particle from the other types of plastic particles.

2. A method as claimed in claim 1, wherein the plastic material is a waste material containing from less than 1 percent to more than 99 percent polyvinyl chloride and another plastic having a similar specific gravity to that of polyvinyl chloride.

3. A method as claimed in claim 1, wherein the plasticizer is chosen from the group consisting of phthalate, phosphate, trimellitate or low temperature plasticizers.

4. A method as claimed in claim 3, wherein the plasticizer is dioctyl phthalate.

5. A method as claimed in claim 3, wherein the plasticizer is dioctyl adipate.

6. A method as claimed in claim 1, wherein one type of plastic particle is separated from the other type of plastic particles by flotation.

7. A method as claimed in claim 1, wherein one type of plastic particle is separated from the other type of plastic particles by centrifugation.

8. A method as claimed in claim 1, wherein the particles are soaked in the plasticizer for a predetermined amount of time from about five to about thirty minutes.

9. A method as claimed in claim 1, wherein the plasticizer during the soaking is maintained in the range of 90 to 130 degrees Centigrade.

10. A method as claimed in claim 1, wherein the plastic material is divided by grinding.

11. A method for the separation of a plastic material containing polyvinyl chloride and polyethylene terephthalate comprising: dividing the plastic material into smaller particles, soaking the divided particles in a plasticizer capable of plasticizing polyvinyl chloride for a predetermined amount of time, removing any excess plasticizer, and separating the polyvinyl chloride particles from the polyethylene terephthalate particles.

12. A method as claimed in claim 11, wherein the plastic material is a waste material containing from less than 1 percent to more than 99 percent polyvinyl chloride.

13. A method as claimed in claim 11, wherein the plasticizer is chosen from the group consisting of phthalate, phosphate, trimellitate or low temperature plasticizers.

14. A method as claimed in claim 11, wherein the plasticizer is dioctyl phthalate.

15. A method as claimed in claim 11, wherein the plasticizer is dioctyl adipate.

16. A method as claimed in claim 11, wherein the polyvinyl chloride particles and the polyethylene terephthalate particles are separated by flotation.

17. A method as claimed in claim 11, wherein the polyvinyl chloride particles are separated by centrifugation.

18. A method as claimed in claim 11, wherein the particles are soaked in the plasticizer for a predetermined amount of time from about five to about thirty minutes.

19. A method as claimed in claim 11, wherein the plasticizer during the soaking is maintained in the range of 90 to 130 degrees Centigrade.

20. A method as claimed in claim 11, wherein the plastic material is divided by grinding.

* * * * *